2,715,151

ELECTRIC STORAGE BATTERY AND METHOD

Carl Gritman, Sunland, Robert Broussard, Glendale, and Charles A. Toce, Sunland, Calif., and John H. Joynt, Alexandria, Va., assignors to Electro-Acid Corporation, a corporation of Texas No Drawing. Application July 14, 1953,
Serial No. 367,982

9 Claims. (Cl. 136—27)

Our application for patent relates to electric storage batteries of the well-known lead-sulphuric lead type battery. More specifically it is concerned with plate components thereof and the method of producing the same.

An object of our invention is to produce active materials for electric storage batteries, particularly those of the lead-sulphuric acid type, wherein the active ingredients, prior to application to the grids which comprise the cores of the battery plates, are effectively rendered substantially immune to detrimental sulphation, are conditioned for high current and voltage densities and therefore for service at abnormally high rates of both charge and discharge, and which active substances thus treated, can be transported readily and cheaply from a central manufacturing depot, all with actual manufacture of the plates being accomplished at random widely separated and strategically located manufacturing stations, the use of which active materials thus produced and treated, effectively and importantly minimizes production costs.

Another object is to provide a battery of the type described in which both the battery itself and its component parts can be readily produced and assembled with active plate materials pre-treated in the manner described, all at minimum cost and with least possible investment in plant and labor, which battery in service displays long useful life with undiminished capacity, and this even at high and extreme conditions of charge, discharge and temperature.

A further object in the production of electric storage batteries is to provide a method which may be continuous or batch, for treating the active battery ingredients preparatory and prior to actually forming the battery plates whereby these active ingredients are effectively and permanently shielded against detrimental sulphation, and this regardless of the extremes of charge or discharge, or of rapidity, range or violence of temperature changes to which the battery may be subjected, and this even in its fully discharged condition.

Other objects and advantages either will be obvious or will be more fully pointed out during the course of the following description.

Accordingly, our invention may be considered as comprising the several arrangements of parts and in the composition of materials, and as well, in the operational steps and the relation and combination of each of the same with one or more of the others. The scope of the application of all the foregoing, for clarity, is more fully set forth in the accompanying claims.

And now, as conducive to a more thorough understanding of our invention, it may be noted that in certain prior companion applications for patent we have suggested the treatment of lead-sulphuric acid type batteries with compounds of selenium, tellurium or germanium. We found that such treatment achieved the dual purpose of locking the finely divided active ingredients of the plates into the grids comprising the cores of the storage battery plates and, in addition, permitted greatly increased rates of charge and discharge without detrimental sulphation.

Now, we have heretofore contemplated that such treatment of the battery shall take place either immediately prior to assembly of the battery plates in the battery case, or, in some instances, even after final assembly of the battery. For illustratively, we have proposed that we first mount the battery plates in the battery casing and that we then add a preliminary electrolyte which contains a desired compound of a selected one of selenium, tellurium and germanium. When electrolytic action then occurs, the pure metal of the desired compound, or perhaps some compound, deposits out as a thin coating or plating onto the active materials of the plates. This coating of uniform thickness attaches to all surfaces of the finely divided plate material and effectively protects these particles and holds them in place. Thereafter, the preliminary electrolyte is dumped, whereupon we fill the battery casing with the final electrolyte. Upon further charge, the battery is then ready for use.

Alternatively, we have proposed the addition of the selenium, tellurium or germanium additives directly to the final electrolyte. And in this later case, the plating element deposits out, while this battery is in service, onto the particles of the active plate ingredients. This means that a coating is being continuously built up on the plate. Thus, while battery action remains unhindered and unimpaired, the protective film is contantly replenished. It is self-repairing in nature.

In actual practice, however, the practice heretofore employed of manufacturing the batteries complete, ready for service, at a central depot, and then transporting them to the places of use, has become more and more expensive, and as well, additional hazards attend such practice. For not only have transportation costs increased tremendously as concerns these comparatively heavy and compact items, but as well particular care must be accorded these batteries in transit, this, not only so that they themselves will be saved from damage, but so that adjacent merchandise in transit will not be damaged. For should a battery case be broken open ordinarily the active electrolyte will spill out and flow to and attack adjacent merchandise also in transit. The unit cost of such transportation is therefore quite high.

We have undertaken to solve the shipping problem, at least to a certain extent, by making it possible first to prepare the treated battery plates, and then remove them from the casing and ship them in dry condition either separately or in the casing, as desired. Final assembly occurs at place of use. In the application for patent describing that practice we have provided for the removal of the electrolyte upon completion of initial battery forming action. We thereupon ship the battery, together with its plates, in fully discharged and in dry condition. And upon reaching its destination, distilled water is added, the battery charged and the charged battery thereupon is ready for duty.

While comprising a distinct advance in the art, it is nevertheless true that both of the proposals noted fall somewhat short of full answer to the present problem, both economic and practical in nature, particularly when viewed from a competitive standpoint. For here again, and largely because of the tremendous increase in manufacturing costs in recent years which might well price the batteries out of the market absent cost-reducing economies, it is desirable to minimize these production costs as much as possible.

To this end, it is recognized that the formation of the active plate materials at some central depot would contribute materially were it possible from a practical standpoint. With this mode of production the treated active ingredients could be shipped to assembly points where the plates are formed and where the batteries themselves are assembled. In transit the active ingredients are in dry form, and represent minimum shipping costs. As well, the treated, dried active ingredients may be shipped with much greater safety than is true of the assembled battery. Thus, space demands for shipping are minimized the unit cost of such shipping is maintained comparatively low, and safety in transit is appreciably increased. That the attendant economies would be important is obvious.

When the prepared material is received at the destination, namely, the battery assembly points, it is comparatively simple to take the plate grids and coat them with either the treated pure sponge lead in finely divided form or with the treated finely divided lead peroxide, as the case may be. After this comparatively simple step, the battery may be assembled with minimum effort, requiring labor of only moderate skill. The total manufacturing cost is thus maintained low, so that economically the resultant battery is advantageously situated from a competitive standpoint.

And it may be noted that while many attempts have been made to overcome the foregoing difficulties these efforts for one reason or another have fallen considerably short of success. And measured from a practical standpoint it has heretofore been practically impossible to increase appreciably the ease of manufacture of batteries using treated battery plates, without at the same time substantially increasing the basic costs of these elements.

Accordingly, one of the objects of our invention is the provision of the pre-treated battery plate ingredients, as well as the provision of a method of preparing such ingredients, and the provision of a simple method of making treated battery plates.

Now, in the practice of our invention and in a typical instance, the active materials of the battery plates are prepared and treated at a central supply depot. Substantially all steps requiring careful technique can be performed at this central point. According to our present teachings we coat the finely divided particles of lead dioxide and/or powdered sponge lead, as the case may be, prior to shipment thereof from the main, central treating plant.

In a typical instance we provide a vat in which we treat powdered lead dioxide or powdered sponge lead undergoing preparation. In the vat there is employed an electrolyte of dilute sulphuric acid ($H_2SO_4$) which contains water-soluble selenium, tellurium or germanium compound in small amount. Suitable electrodes are employed, the active plate material serving as one, and the metal itself as another. And with the application of an electric current an electrolytic action thereupon takes place whereby selenium, tellurium or germanium or their compounds deposits out upon each particle of the active plate ingredient, forming a tenacious and thin film thereon. Each particle of the lead dioxide or the lead, as the case may be, is thus provided with a thin film of the particular plating metal or its compound.

In a typical instance, we contemplate providing the active plate material in a tray, suitable electrical connection being made to the active material as noted. This tray is formed of a suitable plastic which, while pervious to liquids and permitting ready passage of the electrolyte through the interstices thereof, at the same time effectively prevents the passage therethrough of any of the solid particles of plate material. Preferably the tray is agitated so that the solid plate ingredients undergoing treatment are effectively prevented from packing.

Alternatively, we contemplate the use of a continuous belt on which the material undergoing treatment is passed, which belt passes through the treating zone wherein the electrolyte is located, and under the influence of the electrolytic action aforesaid. In such case the active plate material itself is one electrode of the electrical system.

The treated plate materials when removed from the vat are dried and mixed with appropriate binder, where desired, and are ready for shipment to battery manufacturers.

As an alternative, we find it advantageous at the central depot to take either powdered or sponge lead or powdered lead dioxide, as the case may be and in a suitable mixing vat, incorporate with this basic starting material small quantities of either pure selenium, tellurium, or germanium or a suitable water-soluble or sulphuric acid-soluble compound thereof, preferably one of high-oxygen content. Illustratively, these may be selected from the acids of the particular element selected, or the di-bromide, the di-chloride, the tetrachloride, the tetraiodide, or the oxychloride thereof. If required, a suitable binder is employed. Mixing proceeds, through the use of a suitable and conventional mechanical mixer, until a paste is formed in which the ingredients are blended in intimate admixture. This paste is suitable for subsequent application to the battery grids. Thus prepared the paste material, in solid form, is ready for shipment to the point of manufacture. Illustratively, about 0.1% by weight of the desired selenium, tellurium or germanium additive is employed.

When this paste-like product is received in the assembly point, it is there applied upon the grids of the battery plates in a pasting operation. This is extremely simple. The battery is then assembled, employing the plates thus formed. For this purpose we employ a battery casing which may be of the usual acid-resistant material. Preferably, it has conventional configuration. In this casing we provide at least one plate with active material which is essentially lead dioxide. This serves as the positive pole of the battery. And at least one plate has as its active material essentially pure sponge lead. This serves as the negative pole.

The electrolyte is thereupon added, and a charging current is passed between the electrodes. This serves to form the plates. Upon the occurrence of the electrolytic action in the battery solution, of conventional dilute sulphuric acid, say ⅓ sulphuric acid ($H_2SO_4$) by volume and ⅔ distilled water ($H_2O$) by volume, and between the electrodes, the coating material, be it selenium, tellurium or germanium, plates out on the finely divided active particles of the battery plate.

From the foregoing it will be seen that, prior to using the finely divided particles of the active plate materials, be the same pure powdered or sponge lead or powdered lead peroxide, by the practice of our invention these particles are effectively coated and plated with an extremely thin film of a pure metal or compound having unidirectional electric current-transmitting properties. This metal is a selected one of selenium, tellurium and germanium. Uniformly thin, this coating does not adversely affect the battery action of these plate materials when the same are placed in use.

Following the teachings of our invention it is seen that the battery materials are first treated at a central depot. Here we employ the greater part of such skilled labor as is required in the production of the finished battery. We intend that such preliminary treatment of the active plate materials be either batch or continuous process. We contemplate the use of the active plate material undergoing treatment as one of the electrodes of the electrolytic units. Additionally, we contemplate the use as one electrode of the preliminary electrolytic bath, a pure metal selected from the group consisting of selenium, tellurium or germanium.

The active plated material thus treated has coated thereon a thin, uniform and tenacious film of the plating material. This plate material greatly enhances battery action. In addition, it effectively locks the finely divided plate material in the grid to which it is subsequently applied, as by a pasting operation or the like. Moreover, and in subsequent use, this film effectively protects the active plate material against detrimental sulphation. Also, it permits the use of higher gravity battery electrolytes and higher rates of charge and discharge.

Regardless of which one of the several expedients which we have suggested is employed in the actual preliminary treatment of the active plate materials, the materials thus treated can thereupon be shipped safely and economically, either in powdered or paste form, to the point where the battery plates are to be made up.

At the battery construction plant, it is comparatively simple and rapid operation, involving but moderate skill and this in limited quantity, to apply the treated coating material as a paste to the plate grid. Where necessary, and without detriment, we may add a small quantity of neutral binder to the treated active plate materials at that station of manufacture, thereby increasing the readiness with which the treated materials can be applied to the grids. The active materials cling tenaciously to the interstices of the grid.

It is readily apparent from the foregoing that basically, the practice of our invention is simple, rapid, low in cost and certain and predictable in results, markedly enhancing and bettering the competitive position in the market of batteries conforming to our mode of production. All of these, as well as many other practical objectives attend upon the practice of our invention.

It is apparent from the foregoing that the several methods which we have described of carrying our invention into practice are purely illustrative. Our invention is not to be limited to the exact forms thus disclosed. And it is to be understood that for proper protection, our invention is intended to, and does, cover all such reasonable modifications of the disclosed embodiments as properly fall within the scope of the following claims.

We claim:

1. In the production of an electric storage battery of the lead-lead peroxide-sulphuric acid type, the method of preliminarily treating the active plate materials thereof, apart from and before they are applied to the plates themselves, comprising subjecting plate material selected from the group consisting of powdered lead, sponge lead and powdered lead peroxide to electrolytic action in the presence of a sulphuric acid electrolyte and soluble compound of an element selected from the group consisting of selenium, tellurium and germanium, for a time sufficient to plate onto the particles of the active material, a thin film of the plating material.

2. The method of pre-treating active plate materials for a lead-lead peroxide-sulphuric acid storage battery, comprising preliminary subjecting plate material selected from the group consisting of finely divided powdered lead, sponge lead, and powdered lead peroxide to electrolytic action in sulphuric acid and water-soluble compound selected from the group consisting of the acids, the di-bromide, the di-chloride, the tetrachloride, the tetra-iodide and the oxychloride of selenium, tellurium and germanium for a time sufficient to plate onto the said material a thin film of plating material.

3. The method of treating battery plate materials, apart from and before these materials are applied to the battery plates, comprising submerging a batch of plate material selected from the group consisting of powdered lead, sponge lead and powdered lead peroxide in an electrolyte of dilute sulphuric acid and which electrolyte contains a water-soluble compound of high oxygen content of an element selected from the group consisting of selenium, tellurium and germanium; and thereupon subjecting said batch to electrolytic action as electrode for a time sufficient to plate out, onto the particles of the active material, a thin and uniform film of the plating material.

4. The method of treating the active plate materials of a battery, apart from and before these materials are applied to the battery plates, comprising providing an electrolytic bath comprising dilute sulphuric acid containing a water-soluble compound, of high-oxygen content, of element of the group consisting of selenium, tellurium and germanium; and continuously passing through said electrolytic bath a supply of the active plate material selected from the group consisting of powdered lead, sponge lead and powdered lead peroxide, said active plate material serving as one electrode of the electrolytic bath, and exposing the particles of active plate materials during said electrolytic action through the passage through the electrolytic bath for a time sufficient to plate out of said electrolyte and onto the particles of the active material a thin and uniform film containing one of said elements.

5. The method of treating the active plate materials subsequently employed in the manufacture of electric storage batteries of the lead-sulphuric acid type, comprising subjecting material selected from the group consisting of powdered lead, sponge lead and powdered lead peroxide, in the presence of a dilute sulphuric acid electrolyte, to electrolytic action created by the passage of electric current between said active plate materials as one electrode in the electrolyte, and element selected from the group consisting of selenium, tellurium and germanium as another electrode for a time sufficient to plate onto said active material a thin film of plating material.

6. In the production of an electric storage battery plate, the method of preliminarily treating the active plate materials thereof, apart from and before they are applied to the plates themselves, comprising subjecting material selected from the group consisting of powdered lead, sponge lead and powdered lead peroxide to electrolytic action as an electrode in the presence of an electrolyte containing dilute sulphuric acid and an element selected from the group consisting of selenium, tellurium and germanium for a time sufficient to plate onto the particles of the active material, a thin film of the plating material; and thereafter pasting the treated material onto battery plate grids.

7. A method of providing a plate for an electric storage battery of the lead-sulphuric acid type, comprising intimately admixing with material selected from the group consisting of powdered lead dioxide, powdered lead and sponge lead, about 0.1% by weight of compound selected from the group consisting of soluble compounds of selenium, tellurium or germanium, together with a small quantity of binder sufficient to form a paste; applying such paste to pure lead grids; assembling a battery of alternating plates of lead and lead dioxide, with dilute sulphuric acid electrolyte; and energizing said battery to electrolyze the plate elements and thereby plate out upon each particle of each material, a thin coating of uniform thickness of the metallic plating compound.

8. An active battery plate material comprising a paste formed of material selected from the group consisting of powdered lead, sponge lead and powdered lead dioxide, the particles of which have been preliminarily conditioned for tenacious cohesion of the particles amongst themselves and adhesion to the battery grid to which they are subsequently applied, by coating out onto such particles through electrolytic action a thin film of a material comprising about 0.1% by weight of compound selected from the group consisting of compounds of selenium, tellurium and germanium.

9. As a new article of manufacture, battery plates for an electric storage battery of the lead sulphuric acid type comprising a grid into the interstices of which is pasted a layer comprised of a paste formed of a material selected from the group consisting of powdered lead, sponge lead, and powdered lead peroxide, onto the individual particles of which has been preliminarily plated a thin and uniform coating of metal or compound selected from the group consisting of selenium, tellurium and germanium, which coating, while thin enough so that it will leave battery action of the plate unimpaired, is of sufficient thickness and clings with sufficient tenacity to lock the particles of the plate materials into the grid.

References Cited in the file of this patent

UNITED STATES PATENTS

| | | |
|---|---|---|
| 291,526 | Molera et al. | Jan. 8, 1884 |
| 309,886 | Shaw | Dec. 30, 1884 |
| 1,722,358 | Seljesater | July 30, 1929 |
| 2,202,532 | Malcolm | May 28, 1940 |
| 2,389,832 | Williams | Nov. 27, 1945 |
| 2,414,438 | Bloom | Jan. 21, 1947 |
| 2,649,409 | Van Hippel et al. | Aug. 18, 1953 |
| 2,649,766 | Johnson | Aug. 25, 1953 |

FOREIGN PATENTS

| | | |
|---|---|---|
| 17,674 of 1905 | Great Britain | Sept. 1, 1906 |

OTHER REFERENCES

Storage Batteries, by Vinal, 1940, pp. 24–35, 118, 119, 140, 141, 307–311.